(12) United States Patent
Vojak

(10) Patent No.: US 9,996,083 B2
(45) Date of Patent: Jun. 12, 2018

(54) SYSTEM AND METHOD FOR NAVIGATION ASSISTANCE

(71) Applicant: Sharp Laboratories of America (SLA), Inc., Camas, WA (US)

(72) Inventor: William Vojak, Battle Ground, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 39 days.

(21) Appl. No.: 15/141,316

(22) Filed: Apr. 28, 2016

(65) Prior Publication Data

US 2017/0315558 A1 Nov. 2, 2017

(51) Int. Cl.
*G05D 1/02* (2006.01)
*G01C 21/20* (2006.01)
*G05D 1/00* (2006.01)
*G01S 19/42* (2010.01)
*G01S 13/06* (2006.01)

(52) U.S. Cl.
CPC ........... *G05D 1/0236* (2013.01); *G01C 21/20* (2013.01); *G01S 13/06* (2013.01); *G01S 19/42* (2013.01); *G05D 1/0088* (2013.01); *G05D 1/0248* (2013.01)

(58) Field of Classification Search
CPC .. G05D 1/0236; G05D 1/0088; G05D 1/0248; G01C 21/20; G01S 13/06; G01S 19/42
USPC .......................................................... 701/23
See application file for complete search history.

(56) References Cited

U.S. PATENT DOCUMENTS

| 5,646,614 | A | * | 7/1997 | Abersfelder ........... B60Q 9/005 340/435 |
|---|---|---|---|---|
| 7,340,076 | B2 | | 3/2008 | Stach et al. |
| 7,925,049 | B2 | | 4/2011 | Zhu et al. |
| 8,022,812 | B2 | | 9/2011 | Beniyama et al. |
| 8,134,479 | B2 | | 3/2012 | Suhr et al. |
| 8,174,568 | B2 | | 5/2012 | Samarasekera et al. |
| 8,238,612 | B2 | | 8/2012 | Susca et al. |
| 8,340,901 | B2 | | 12/2012 | Fahn et al. |
| 8,447,863 | B1 | | 5/2013 | Francis, Jr. et al. |
| 8,655,513 | B2 | | 2/2014 | Vanek |

(Continued)

*Primary Examiner* — Anne M Antonucci
*Assistant Examiner* — James E Stroud
(74) *Attorney, Agent, or Firm* — Law Office of Gerald Maliszewski; Gerald Maliszewski

(57) ABSTRACT

A system and method are provided for navigation correction assistance. The method provides a vehicle with a camera and an autonomous navigation system comprising a navigation buoy database and a navigation application. The navigation application visually acquires a first navigation buoy with an identity marker and accesses the navigation buoy database, which cross-references the first navigation buoy identity marker to a first spatial position. A first direction marker on the first navigation buoy is also visually acquired. In response to visually acquiring the first direction marker, a first angle is determined between the camera and the first spatial position. A first distance may also be determined between the vehicle and the first navigation buoy using visual methods or auxiliary position or distance measurement devices. Then, in response to the first spatial position, the first angle, and the first distance, the spatial position of the vehicle can be calculated using trigonometry.

20 Claims, 6 Drawing Sheets

(56) References Cited

U.S. PATENT DOCUMENTS

| | | |
|---|---|---|
| 8,660,736 B2 | 2/2014 | Chen et al. |
| 8,661,605 B2 | 3/2014 | Svendsen et al. |
| 8,663,130 B2 | 3/2014 | Neubach et al. |
| 8,705,842 B2 | 4/2014 | Lee et al. |
| 8,825,387 B2 | 9/2014 | Mays et al. |
| 8,918,241 B2 | 12/2014 | Chen et al. |
| 8,929,604 B2 | 1/2015 | Platonov et al. |
| 8,937,410 B2 | 1/2015 | Comins et al. |
| 9,157,757 B1 | 10/2015 | Liao et al. |
| 9,378,558 B2 * | 6/2016 | Kajiwara ............... G06T 7/248 |
| 9,535,123 B2 * | 1/2017 | Mittal ............... G01R 31/3177 |
| 2004/0167667 A1 | 8/2004 | Goncalves et al. |
| 2005/0010342 A1 * | 1/2005 | Li ............................ B60R 1/00 |
| | | 701/36 |
| 2006/0055530 A1 | 3/2006 | Wang et al. |
| 2006/0056707 A1 | 3/2006 | Suomela et al. |
| 2006/0058921 A1 | 3/2006 | Okamoto |
| 2007/0027579 A1 | 2/2007 | Suzuki et al. |
| 2007/0061041 A1 | 3/2007 | Zweig |
| 2007/0100498 A1 | 5/2007 | Matsumoto et al. |
| 2007/0188328 A1 | 8/2007 | Mochizuki et al. |
| 2007/0271003 A1 | 11/2007 | Bang et al. |
| 2007/0297075 A1 * | 12/2007 | Schofield ................. B60R 1/04 |
| | | 359/872 |
| 2008/0077511 A1 | 3/2008 | Zimmerman |
| 2009/0012667 A1 | 1/2009 | Matsumoto et al. |
| 2009/0074545 A1 | 3/2009 | Lert, Jr. et al. |
| 2009/0207257 A1 | 8/2009 | Jung et al. |
| 2010/0076631 A1 | 3/2010 | Mian |
| 2010/0155156 A1 | 6/2010 | Finkelstein |
| 2011/0106312 A1 | 5/2011 | Chen et al. |
| 2012/0121161 A1 | 5/2012 | Eade et al. |
| 2013/0231779 A1 | 9/2013 | Purkayastha et al. |
| 2013/0242101 A1 * | 9/2013 | Schneider ............. G08G 1/168 |
| | | 348/148 |
| 2015/0109148 A1 * | 4/2015 | Cheatham ............. G08G 1/005 |
| | | 340/944 |
| 2015/0328775 A1 * | 11/2015 | Shamlian ............. B25J 9/1676 |
| | | 700/258 |
| 2015/0378361 A1 * | 12/2015 | Walker ................ G05D 1/0206 |
| | | 701/21 |
| 2016/0223643 A1 * | 8/2016 | Li ........................... G01S 7/023 |

\* cited by examiner

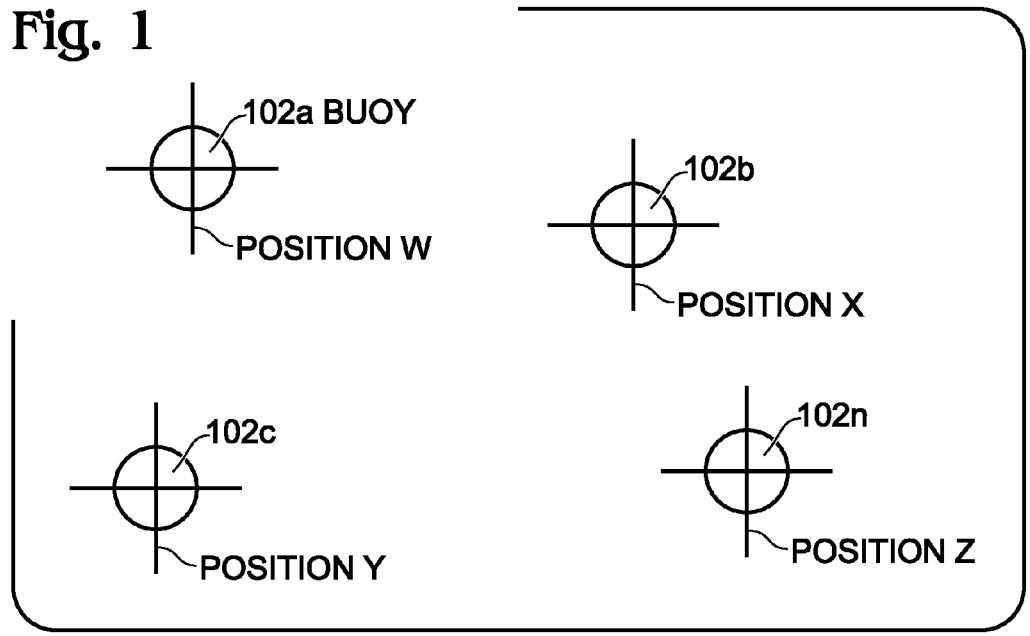
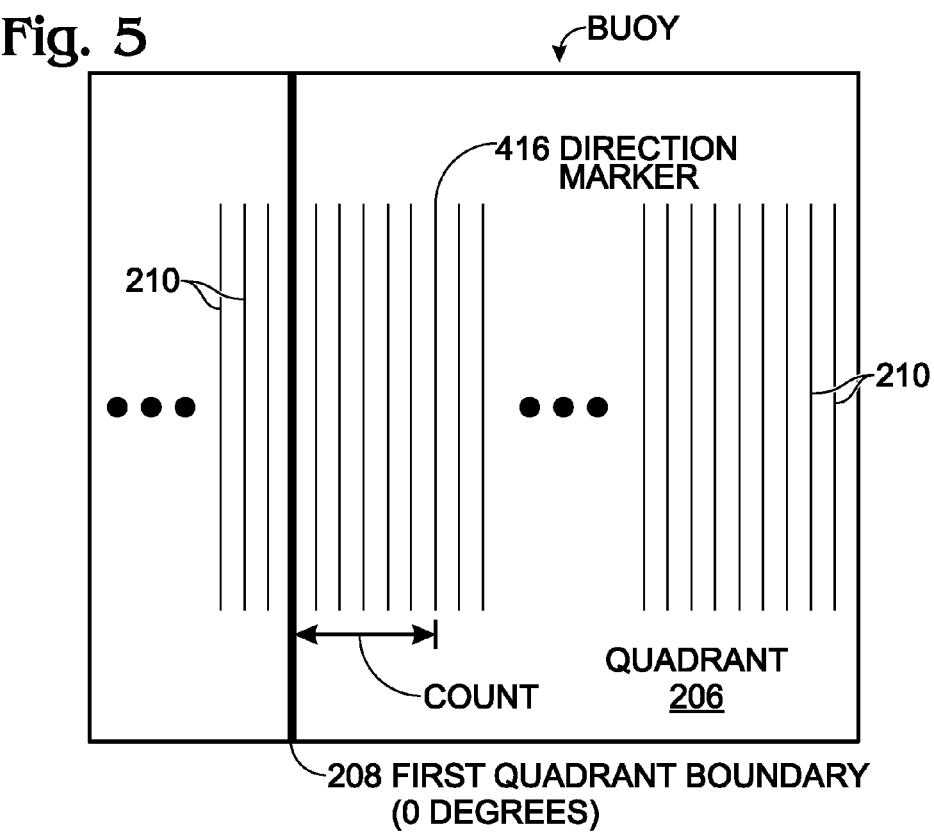

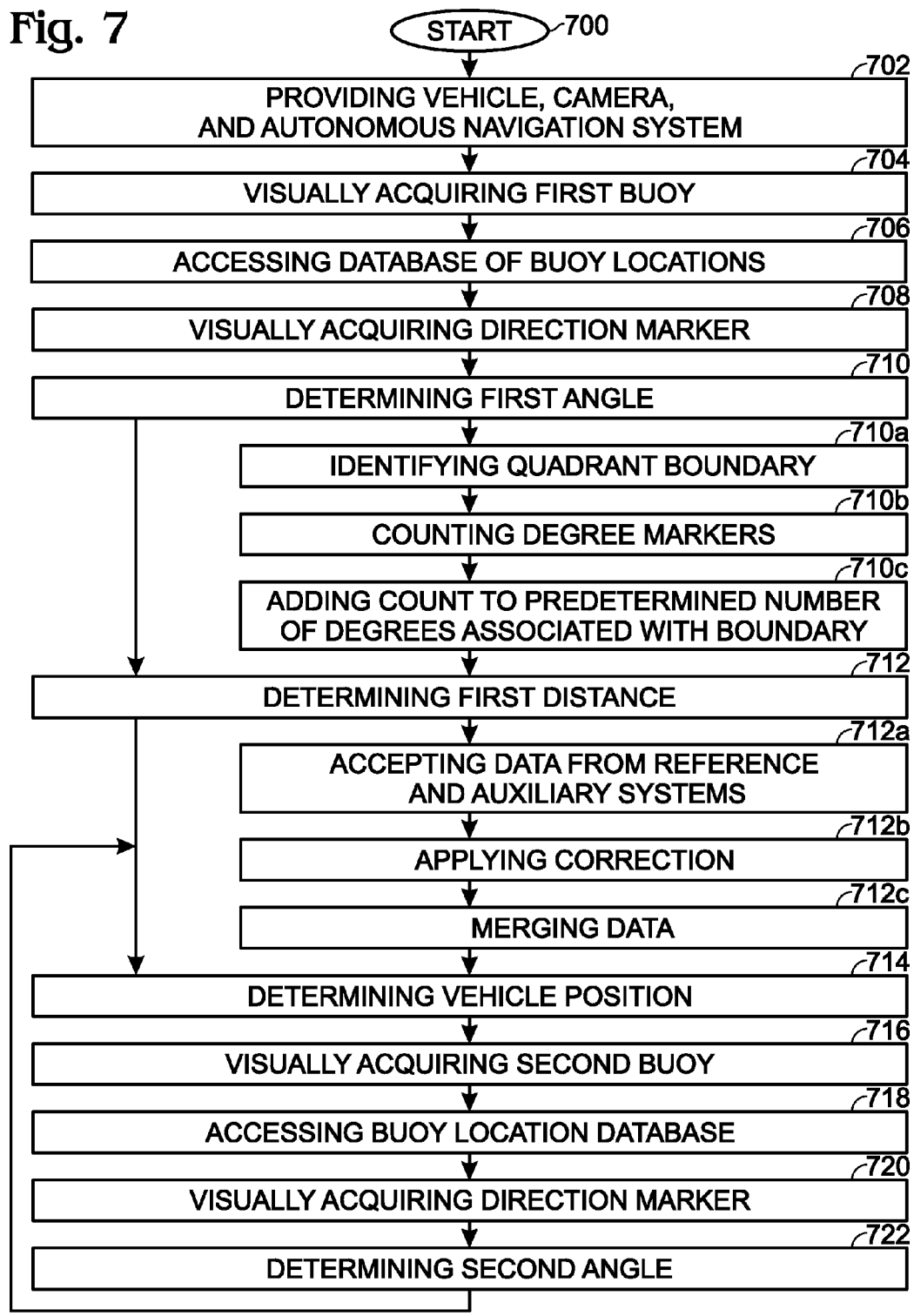

SYSTEM AND METHOD FOR NAVIGATION ASSISTANCE

BACKGROUND OF THE INVENTION

1. Field of the Invention

This invention generally relates to autonomous navigation and, more particularly, to a system and method for using visual navigation buoys with predetermined locations to aid in the task of autonomous navigation.

2. Description of the Related Art

In navigation, odometry is the use of data from the movement of actuators to estimate change in position over time through devices such as rotary encoders to measure wheel rotations. Visual odometry is the process of determining equivalent odometry information using sequential camera images to estimate the distance traveled. There are many existing approaches to visual odometry are based on steps of image acquisition and correction, feature detection and tracking, the estimation of camera motion, and the calculation of feature geometric relationships.

Egomotion is defined as the 3D motion of a camera within an environment. In the field of computer vision, egomotion refers to estimating a camera's motion relative to a rigid scene. An example of egomotion estimation would be estimating a car's moving position relative to lines on the road or street signs being observed from the car itself. The goal of estimating the egomotion of a camera is to determine the 3D motion of that camera within the environment using a sequence of images taken by the camera. The process of estimating a camera's motion within an environment involves the use of visual odometry techniques on a sequence of images captured by the moving camera. As noted above, this may be done using feature detection to construct an optical flow from two image frames in a sequence generated from either single cameras or stereo cameras. Using stereo image pairs for each frame, for example, helps reduce error and provides additional depth and scale information. Stereo vision uses triangulation based on epipolar geometry to determine the distance to an object.

Currently, most autonomous robot navigation systems are implemented based on a high end sensor, such as a laser scanner, high accuracy GPS receiver, or orientation sensor (inertia measurement unit (IMU)). These sensors add to the cost of the robots, making them unaffordable for many applications. Visual odometry offers the potential of added redundancy to increase accuracy and/or cheaper equipment costs, but at the expense of high computation difficulty.

It would be advantageous if visual odometry could be simplified with the use of landmarks having predefined locations to aid in the task of autonomous navigation.

SUMMARY OF THE INVENTION

Disclosed herein are a system and method permitting an autonomous vehicle to apply high accuracy corrections derived from visually identifiable navigation buoys, independent of any other navigational methods, such as global positioning satellites (GPS), which may also be in use. As the term is used herein, "navigation buoy" or "buoy" means a visual navigation guidepost or landmark or other marking device positioned on land and not in water. Alternative terms for "navigation buoy" or "buoy" to describe that element of the present invention include, for example, landmark, mark, guidepost, post, beacon, marker and identifier.

With the advent of economical high resolution optical cameras, with economical but high quality optical and digital zoom, an autonomous vehicle can read highly detailed information from a marker (buoy). Therefore, information can be encoded on a marker that permits an autonomous vehicle to extract detailed navigational information. The buoys have a known location (latitude/longitude/height), and the locations of the buoys are known to the autonomous vehicle. The angular relationship between the buoys is known to the autonomous vehicle, as well as the exact distance between two or more markers. The buoys are encoded with identifiers such as labels like "21A" and "21B", or barcodes that can be read optically. The buoys also have a form of angular degree coding on them.

The autonomous vehicle "sees" one or more buoys and identifies the buoys via the labels or the barcodes. The vehicle determines the distances to the buoys via laser or GPS measurements, or through optical estimation. By reading the angular degree coding from the markers, the vehicle calculates its exact position using basic trigonometry functions (e.g., angle/side/angle). The buoys can be illuminated either internally or externally for night time use Accordingly, a method is provided for navigation correction assistance. The method provides a vehicle with a camera and an autonomous navigation system comprising a processor, a non-transitory memory, and a navigation buoy database stored in the memory. A navigation application is also stored in the memory. The navigation application visually acquires a first navigation buoy with an identity marker and accesses the navigation buoy database, which cross-references the first navigation buoy identity marker to a first spatial position. A first direction marker on the first navigation buoy is also visually acquired. In response to visually acquiring the first direction marker, a first angle is determined between the camera and the first spatial position. A first distance may also be determined between the vehicle and the first navigation buoy. Then, in response to the first spatial position, the first angle, and the first distance, the spatial position of the vehicle can be known. The first distance may be determined using one of the following: laser measurement (LiDAR), radar measurement, visual measurement (visual odometry), GPS information, or inertial measurement dead reckoning.

If a second navigation buoy with an identity marker is visually acquired, the navigation buoy database can be accessed to cross-reference the second navigation buoy identity marker to a second spatial position. By visually acquiring a second direction marker on the second navigation buoy, a second angle between the camera and the second spatial position can be determined. Then, in response to the first spatial position, the second spatial position, the first angle, and the second angle, the spatial position of the vehicle can be determined.

More explicitly, determining the first angle includes initially identifying a first quadrant with a first quadrant boundary marker, where the first quadrant represents a first predetermined general geographic direction (e.g., North-East) divided into a plurality of degrees with corresponding degree markers. The first quadrant boundary marker represents a predetermined number of degrees associated with an explicit geographic direction (e.g., 0 degrees or North). Then, the number of degree markers between the first quadrant boundary and the first direction marker is counted, and the count is added to the predetermined number of degrees to calculate the first angle. Typically, the first direction marker is a degree marker in the centerline of a vehicle camera image.

Additional details of the above-described method, a navigation buoy system, and a system for navigation correction assistance are provided below.

BRIEF DESCRIPTION OF THE DRAWINGS

FIG. 1 is a plan view of a navigation buoy system.

FIG. 5 is a depiction a buoy to support the explanation of an exemplary process for acquiring the angle between a buoy and the vehicle camera.

FIG. 7 is a flowchart illustrating a method for navigation correction assistance.

DETAILED DESCRIPTION

FIG. 1 is a plan view of a navigation buoy system. The system 100 comprises a plurality of visual navigation buoys 102a through 102n. In this example, n=4, but more generally n is an integer not limited to any particular value. Each visual navigation buoy 102a-102n has a predetermined spatial position (e.g., latitude, longitude, and height), respectively, at positions w, x, y, and z. The buoys, which may also be referred to as guideposts, landmarks, beacons, or markers, have positions that are typically fixed. In the event that the buoy positions are either intentionally or unintentionally moved, their moved positions in known. As explained in more detail below, buoy positions are maintained in buoy (position) database. Although not explicitly shown, the buoys be equipped with a global positioning satellite (GPS) receiver to determine their position, and a transmitter to broadcast their location coordinates.

Figure 2:
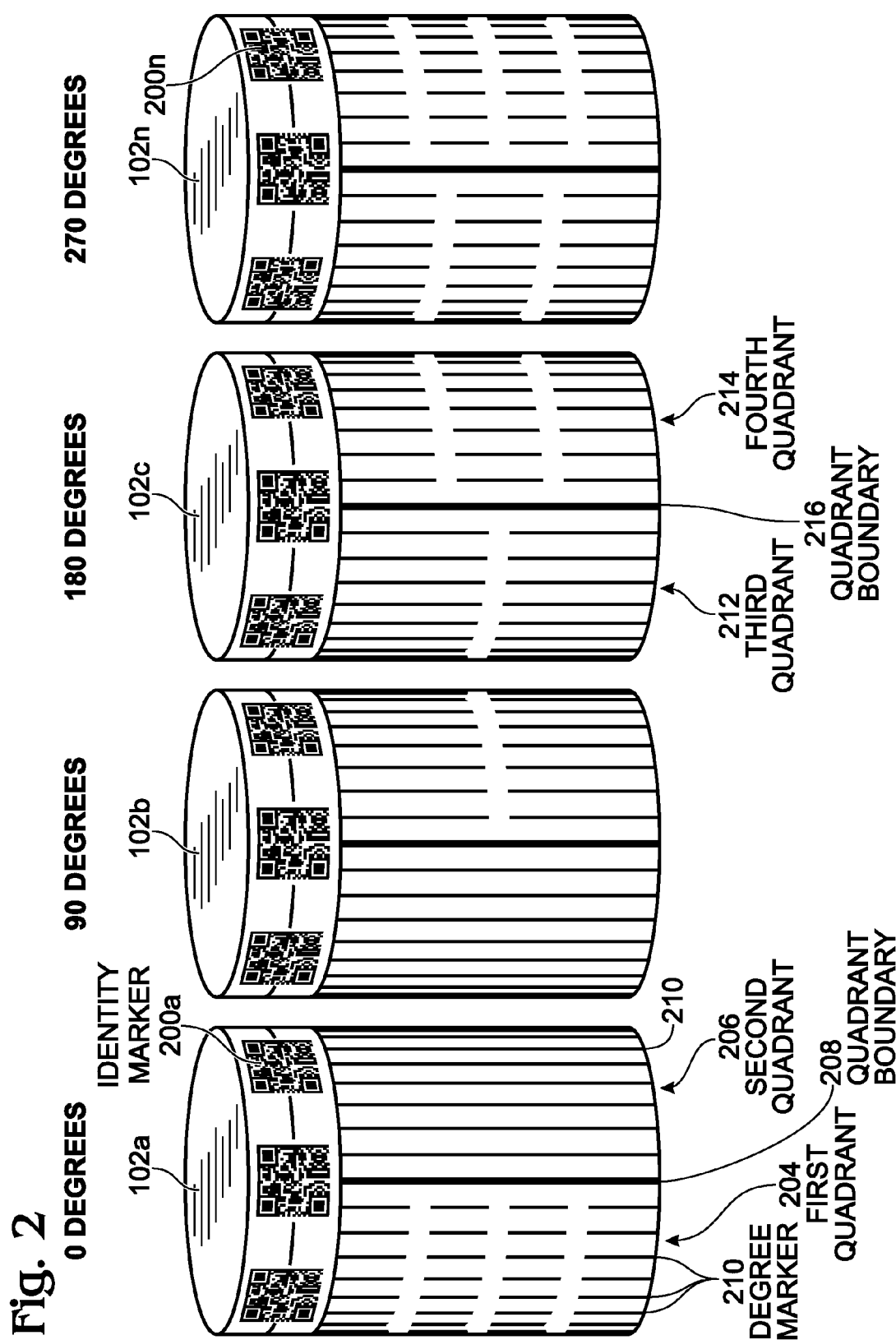
FIG. 2 is a detailed perspective view of four buoys.

FIG. 2 is a detailed perspective view of four buoys. Each buoy has an identity marker cross-referenced to its spatial position, and a circumference with a plurality of direction markers. For example, buoy 102a has identity marker 200a and buoy 102n has identity marker 200n. As shown, the identity markers are barcodes, but they could also be number letters, or any other kind of visually recognizable symbol.

As shown, the direction markers may be organized into quadrants. Using buoy 102a as an example, first quadrants 204 and second quadrant 206 are visible. Each quadrant is associated with a general geographic direction (e.g., North-East, South-West) and divided into a plurality of degrees. Each quadrant boundary is associated with a predetermined number of degrees cross-referenced to an explicit geographic direction. Again using buoy 102a as an example, quadrant boundary 208 is associated with 0 degrees, which may be North. The quadrants are sub-divided by degree markers 210. In a 360 degree system, the circumference of a buoy may be circumscribed by 360 degree markers, although this number may vary depending on accuracy requirements.

Each quadrant is uniquely visually marked. Using buoy 102a as an example, quadrant 206 is identified by no horizontal marks (stripes of interruption in the degree marks 210) and quadrant 204 is identified by 3 horizontal marks. By visually identifying these two quadrants, the quadrant boundary 208 can be determined, or more explicitly, the explicit geographic direction (0 degrees, North) of the quadrant boundary is known. To continue the example using buoy 102c, third quadrant 212 and fourth quadrant 214 can be visually identified, which permits the identification of quadrant boundary 216, and therefore, the explicit geographic direction associated with 180 degrees (South).

Figure 3:
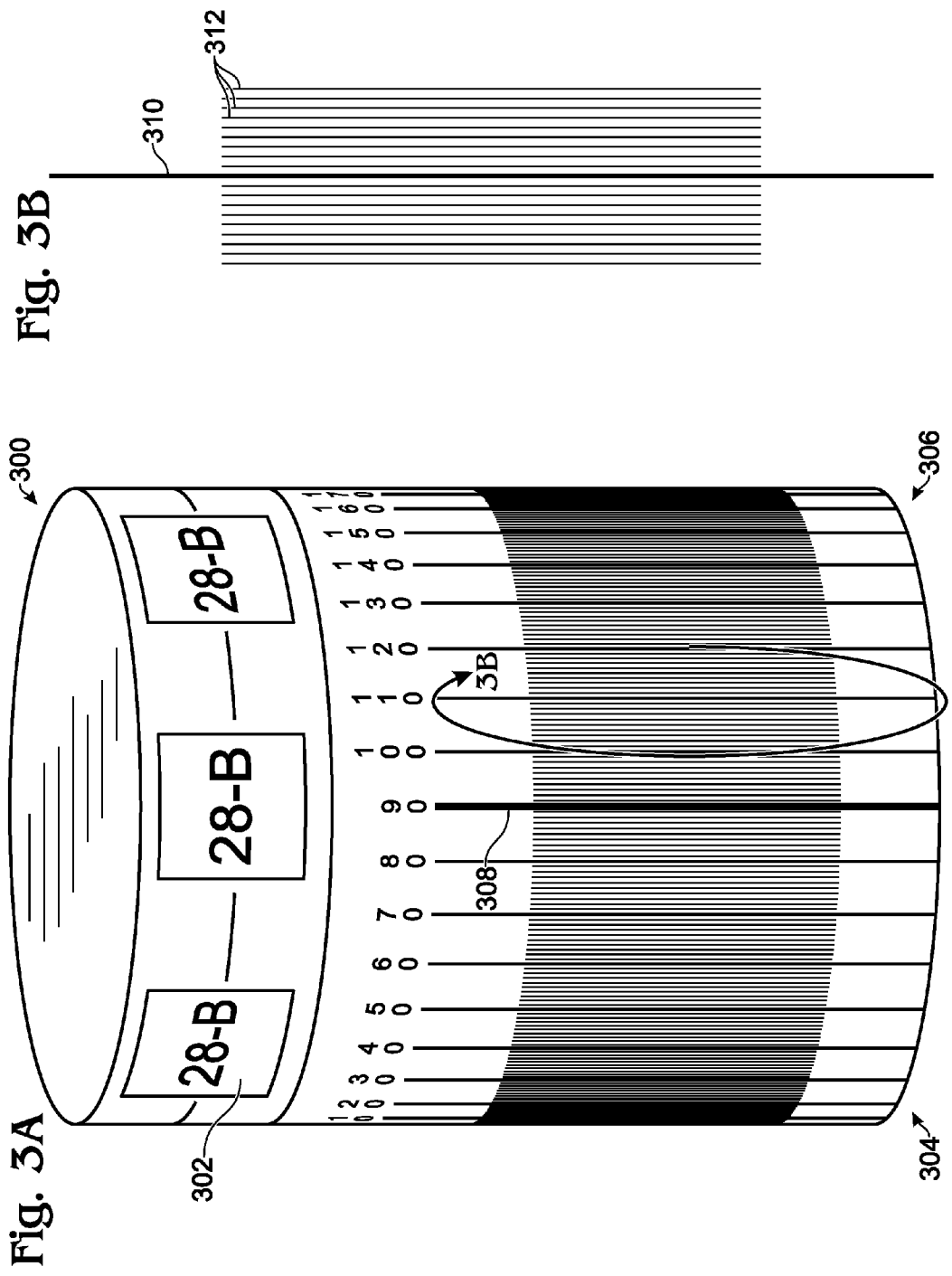
FIGS. 3A and 3B are, respectively, detailed views of a buoy and of degree markers.

FIGS. 3A and 3B are, respectively, detailed views of a buoy and of degree markers. In FIG. 3A buoy 300 comprises identity makers 302, visible quadrants 304 and 306, quadrant boundary 308, and degree markers. As shown in FIG. 3B, the degree markers arranged by decade 310 (e.g., 150 degrees) and sub-divided with degree marks 312.

Figure 4:
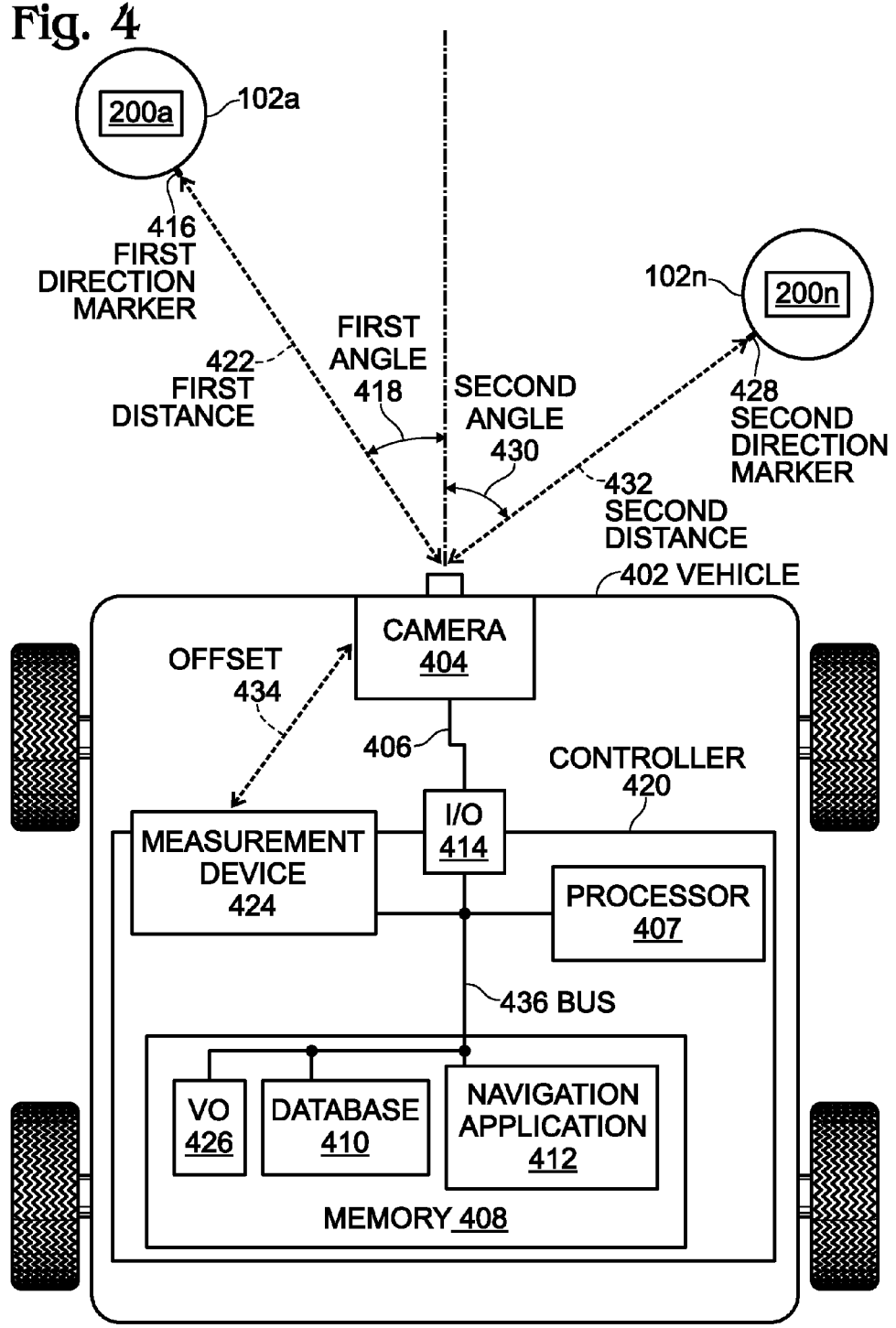
FIG. 4 is a schematic block diagram of a system for navigation correction assistance.

FIG. 4 is a schematic block diagram of a system for navigation correction assistance. The system 400 comprises a first navigation buoy 102a having a predetermined spatial position, an identity marker, and a circumference with predetermined direction markers (see FIG. 2 for details). The system 400 further comprises a vehicle 402, a camera 404 mounted in the vehicle having an output on line 406 to supply images. Although a single camera is shown, a stereo camera system may also be employed. The system 400 also comprises a processor 407, non-transitory memory 408, and visual navigation buoy database 410 stored in the memory comprising navigation buoy identify markers cross-referenced to spatial positions. A navigation application 412 is stored in memory and is enabled as a sequence of processor executable instructions. The navigation application 412 has an interface (input/output (IO) port) 414 to receive images from the camera on line 406.

The navigation application 412 visually acquires the first navigation buoy 102a, access the navigation buoy database 410 to determine a first spatial position associated with the first navigation buoy identity marker (200a, see FIG. 2). The phrase "visually acquire" should be understood in the context of some type of visual odometry algorithm that identifies and tracks features that have been converted from image data supplied by the camera 404 to digital information that can be processed in cooperation between the processor 407 and navigation application 412. The navigation application 412 visually acquires a first direction marker 416 on the first navigation buoy 102a, and determines a first angle 418 between the camera 404 and the first spatial position. As shown, the processor 407, database 410, and navigation application 412 are co-located with the vehicle in a controller 420. Alternatively but not shown, some or all of these components may be located off the vehicle, and connected via a wireless communications interface. Note: if the buoys are capable of broadcasting their position and the vehicle is equipped with a receiver to accept position broadcasts from the buoys, then the database may not be required.

The navigation application 412 also has an interface to accept a measurement of a first distance 422 between the vehicle 402 and the first navigation buoy 102a. In response to knowing the first spatial position of the first buoy 102a, the first angle 418, and the first distance 422, the navigation application can determine the spatial position of the vehicle 402. A measurement device has an output interface to supply position-related data for calculating the first distance measurement. The measurement device may be a hardware device 424 such as a laser range finder (laser detection and ranging (LiDAR)), radar, a global positioning satellite (GPS) receiver, or an inertial measurement unit (IMU). The laser and radar devices actually measure the first distance 422, while GPS and IMU data may be used to calculate the first distance by comparing the known location of a buoy to the estimated location of the vehicle 402. Alternatively, the measurement device may be a distance visual calculation (visual odometry (VO)) module 426 stored in memory 408 and enabled as a sequence of processor executable instructions. In another aspect, the first navigation buoy 102a has a visible feature with a predetermined size, such as a predetermined height or diameter. The navigation application 412, perhaps in cooperation with the VO module 426, determines the first distance 433 between the vehicle 402 and the first navigation buoy 102a by calculating the relationship between the predetermined size of the buoy feature and the amount of image space occupied by the buoy feature. If the camera is equipped with a zoom lens, the first distance can be calculated in response to determining the degree of zoom required to occupy a predetermined portion of the camera image. In this case, the navigation application may exercise control over the zoom function of the camera.

As described above, the system is able to determine the position of the vehicle by visually acquiring a single buoy. However, the system typically comprises a plurality of buoys, and the acquisition of more than one buoy may improve the accuracy of the vehicle position calculation. Shown is a second navigation buoy 102n having a predetermined spatial position, an identity marker 200n, and a circumference with predetermined direction markers (i.e., second direction marker 428). The navigation application 412 visually acquires the second navigation buoy 102n, and accesses the navigation buoy database 410 to cross-reference the second navigation buoy identity marker 200n to a second spatial position. The navigation application 412 visually acquires a second direction marker 428 on the second navigation buoy 102n, determines a second angle 430 between the camera 404 and the second spatial position, and in response to the first spatial position, the second spatial position, the first angle 418, and the second angle 430, determines the spatial position of the vehicle 402. That is, the spatial position of the vehicle can be calculated with greater accuracy knowing both the first angle 418 and the second angle 430. Even greater accuracy is obtained if the second distance 432, between the second buoy 102n and the camera 404, is known. Although not explicitly shown in this figure, the vehicle may visually acquire three or more buoys. Each additionally acquired buoy improves the accuracy of the vehicle position calculation. However, the degree of improvement diminishes with each added buoy.

As explained above in the description of FIGS. 2, 3A, and 3B, the navigation buoy direction markers are organized into quadrants, each quadrant associated with a general geographic direction and divided into a plurality of degrees, where the quadrant boundaries are associated with a predetermined number of degrees cross-referenced to an explicit geographic direction.

FIG. 5 is a depiction of a buoy to support the explanation of an exemplary process for acquiring the angle between a buoy and the vehicle camera. The navigation application identifies a quadrant 206 with a first quadrant boundary 208, counts the number of degree markers 210 between the first quadrant boundary and the first direction marker 416, creating a count. The navigation application adds the count to the predetermined number of degrees associated with the first quadrant boundary (e.g., 0 degrees) to calculate the first angle. In the example shown, the count is equal to 6, as the direction marker 416 is six degree markers 210 from the first quadrant boundary 208. Thus, the first angle is 354 (360−6) degrees. Typically, the navigation application 412 visually acquires the first direction marker 416 by selecting a degree marker in a centerline of the camera image.

Returning to FIG. 4, in one aspect the system 400 comprises a reference measurement device mounted in the vehicle, for example the camera 404, having an output interface to supply position-related data. In addition, an auxiliary measurement device (e.g., measurement device 424) may be mounted in the vehicle 402 a predetermined offset 434 from the reference measurement device, also having an output interface to supply the position-related data. The navigation application 412 accepts position-related data from the reference 404 and auxiliary 424 measurement devices, applies corrections to account for the offset 434, and merges the reference and auxiliary measurement device data. As noted above, the auxiliary measurement device 424 may be a GPS receiver.

The controller 420 may be enabled as a personal computer (PC), Mac computer, tablet, workstation, server, PDA, or handheld device. The processor 407 may be connected to memory 408 and IO 414 via an interconnect bus 436. The memory 408 may include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the processor 407. The IO 414 may be a modem, an Ethernet card, wireless (Bluetooth or WiFi), or any other appropriate data communications device such as USB. The physical communication links may be optical, wired, or wireless.

As noted above, the buoys or markers have a form of angular degree coding on them, with angular information presented based on quadrants, which permits an autonomous vehicle to instantly determine its positional relationship with a buoy by measuring the distance to the buoy. The distance measurement can be made using a laser based measuring method or an optical camera to estimate the distance. In one exact size of a buoy is known and the distance to a buoy can be calculated based on how much zoom is needed to accomplish a specific task such a read a barcode or have the buoy fill a known area of the image. Position related measurements made by devices other than the camera can be adjusted based upon the offset between the auxiliary device and camera.

As noted in the description of FIG. 5, an initial step identifies what quadrant or quadrants can be seen. Then, the quadrant in which the image centerline is determined. The exact degree relationship between the camera and buoy is made by determining which sub-angle marking is in the centerline of the image of the buoy. Once the autonomous vehicle has performed this calculation for each buoy knows the distance to each buoy, its exact angular relationship with each buoy, the exact GPS coordinates of each buoy, the exact distance between the two buoys, and the exact angular relationship between the two buoys. Using simple trigonometric relationships the autonomous vehicle can calculate t exact position. The various quadrants have patterns that vary, so that the camera can easily identify what quadrant(s) it is looking at, and start making the more detailed calculation regarding the autonomous vehicle's angular relationship (bearing) between it and the buoy. This is done to simplify the need for the autonomous vehicle to perform additional text to numeric conversion. A compass on the autonomous vehicle can also be used to enhance the calculations.

An offset can be included in the calculations to move the calculated position to either the center of the vehicle, or to the position when a GPS receiver or other position or distance measurement device is located on the vehicle, to provide an exact vehicle fix.

Figure 6:
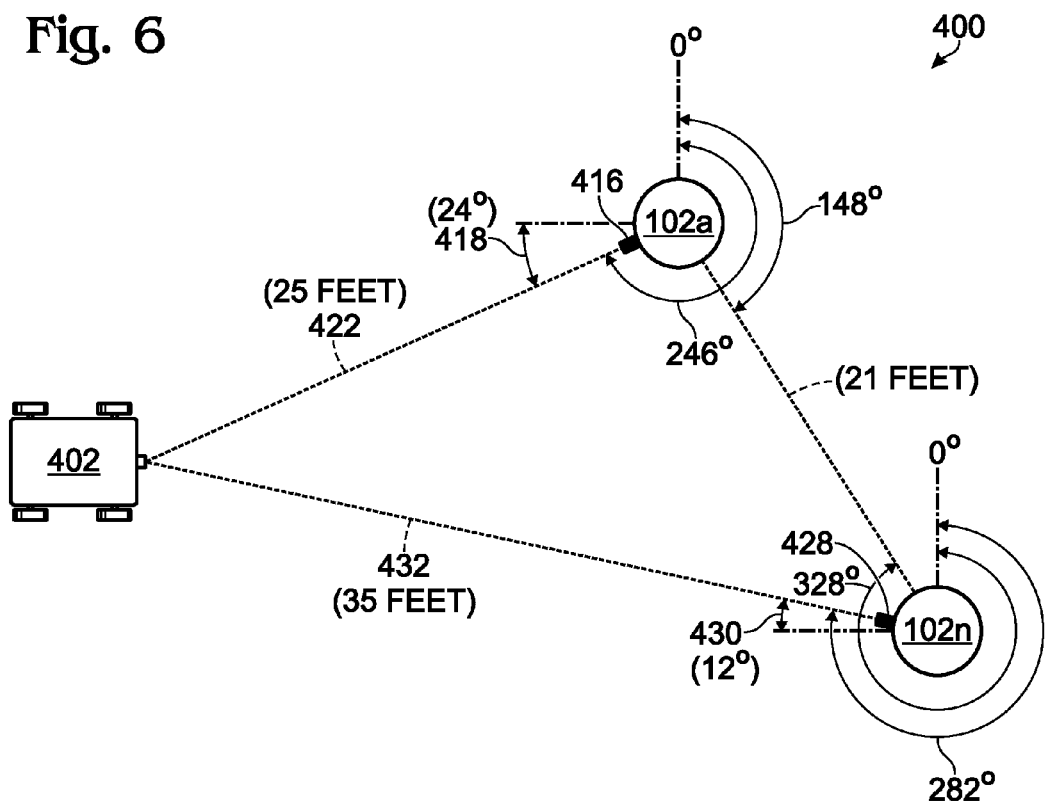
FIG. 6 depicts an example of the system described in FIG. 4 with specific distance and angle measurements.

FIG. 6 depicts an example of the system described in FIG. 4 with specific distance and angle measurements. As shown in the figure, direction marker 416 is located at degree marker 246° of buoy 102a, making first angle 418 equal to 24°. Direction marker 430 is located at degree marker 282° of buoy 102n, making the second angle 430 equal to 12°. From the perspective of buoy 102a, buoy 102n is sited along a direction marker equal to 148°, and from the perspective of buoy 102n, buoy 102a is sited along a direction marker at 328°. The first distance 422 is 25 feet, the second distance 432 is 35 feet, and the distance between buoys is 21 feet.

FIG. 7 is a flowchart illustrating a method for navigation correction assistance. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 700.

Step 702 provides a vehicle with a camera and an autonomous navigation system comprising a processor, a non-transitory memory, a visual navigation buoy database stored in the memory, and a navigation application enabled as a sequence of processor executable instructions stored in the memory for autonomously navigating. In Step 704 the navigation application visually acquires a first visual navigation buoy with an identity marker. Step 706 accesses the navigation buoy database to cross-reference the first navigation buoy identity marker to a first spatial position. Step 708 visually acquires a first direction marker on the first navigation buoy. In response to visually acquiring the first direction marker, Step 710 determines a first angle between the camera and the first spatial position. Step 712 determines a first distance between the vehicle and the first navigation buoy. In response to the first spatial position, the first angle, and the first distance, Step 714 determines a spatial position of the vehicle.

In one aspect, Step 712 determines the first distance using laser measurement, radar measurement, visual (VO) measurement, GPS information, or inertial measurement dead reckoning. Alternatively, in Step 704 or 708 the navigation application visually acquires a navigation buoy having a visible feature with a predetermined size. Then, determining the first distance between the vehicle and the first navigation buoy in Step 712 includes calculating a relationship between the predetermined size of the buoy feature and the amount of camera image space occupied by the buoy feature. In another variation where the camera has a zoom lens, Step 704 or 708 adjusts the camera zoom to visually acquire the navigation buoy visible feature, and Step 712 calculates the relationship between the predetermined size of the buoy visible feature and the degree of zoom required to occupy a predetermined portion of camera image space.

In one aspect, Step 702 provides a vehicle with a reference measurement system and an auxiliary measurement system offset from the reference measurement system by a predetermined amount. Then, determining the first distance between the vehicle and the first navigation buoy in Step 712 includes the following substeps. Step 712a accepts position-related data from the reference and auxiliary measurement systems. Step 712b applies corrections to account for the offset, and Step 712c merges the reference and auxiliary measurement system position-related data. One example of an auxiliary measurement system may be a GPS receiver, and one example of a reference measurement system may be the camera.

In another aspect, Step 716 visually acquires a second navigation buoy with an identity marker. Step 718 accesses the navigation buoy database to cross-reference the second navigation buoy identity marker to a second spatial position. Step 720 visually acquires a second direction marker on the second navigation buoy. In response to visually acquiring the second direction marker, Step 722 determines a second angle between the camera and the second spatial position. Then, in response to the first spatial position, the second spatial position, the first angle, and the second angle, Step 714 determines the spatial position of the vehicle (with additional data points). The method may be extended to visually acquire additional buoys.

Determining the first angle in Step 710 may include substeps. Step 710a initially identifies a first quadrant with a first quadrant boundary, where the first quadrant represents a first predetermined general geographic direction divided into a plurality of degrees with corresponding degree markers. The first quadrant boundary represents a predetermined number of degrees associated with an explicit geographic direction. Step 710b counts the number of degree markers between the first quadrant boundary and the first direction marker, creating a count. Step 710c adds the count to the predetermined number of degrees to calculate the first angle. Typically, the first direction marker is visually acquired by selecting the degree marker in a centerline of a vehicle camera image.

A system and method have been provided for aiding autonomous navigations using buoys with predetermined locations and angular markings. Examples of particular hardware units and measurement techniques have been presented to illustrate the invention. However, the invention is not limited to merely these examples. Other variations and embodiments of the invention will occur to those skilled in the art.

I claim:

1. A method for navigation correction assistance, the method comprising:
   providing a vehicle with a camera and an autonomous navigation system comprising a processor, a non-transitory memory, a visual navigation buoy database stored in the memory, and a navigation application enabled as a sequence of processor executable instructions stored in the memory for autonomously navigating;
   the navigation application visually acquiring a first visual navigation buoy with an identity marker;
   accessing the navigation buoy database to cross-reference the first navigation buoy identity marker to a first spatial position;
   visually acquiring a first direction marker on the first navigation buoy; and,
   in response to visually acquiring the first direction marker, determining a first angle between the camera and the first spatial position.

2. The method of claim 1 further comprising:
   determining a first distance between the vehicle and the first navigation buoy; and,
   in response to the first spatial position, the first angle, and the first distance, determining a spatial position of the vehicle.

3. The method of claim 2 wherein determining the first distance includes using a method selected from a group consisting of laser measurement, radar measurement, visual measurement, global positioning satellite (GPS) information, or inertial measurement dead reckoning.

4. The method of claim 2 wherein providing the vehicle includes providing a vehicle with a reference measurement system and an auxiliary measurement system offset from the reference measurement system by a predetermined amount; and,
wherein determining the first distance between the vehicle and the first navigation buoy includes:
accepting position-related data from the reference and auxiliary measurement systems;
applying corrections to account for the offset; and,
merging the reference and auxiliary measurement system position-related data.

5. The method of claim 2 wherein the navigation application visually acquiring a first navigation buoy includes visually acquiring a navigation buoy having a visible feature with a predetermined size; and,
wherein determining the first distance between the vehicle and the first navigation buoy includes calculating a relationship between the predetermined size of the buoy visible feature and the amount of camera image space occupied by the buoy feature.

6. The method of claim 5 wherein providing the camera includes providing a camera with a zoom lens;
wherein visually acquiring the navigation buoy visible feature with the predetermined size includes adjusting the camera zoom to visually acquire the navigation buoy visible feature; and,
wherein calculating the relationship between the predetermined size of the buoy visible feature and the amount of camera image space occupied by the buoy feature includes calculating the relationship between the predetermined size of the buoy visible feature and the degree of zoom required to occupy a predetermined portion of camera image space.

7. The method of claim 1 further comprising:
visually acquiring a second visual navigation buoy with an identity marker;
accessing the navigation buoy database to cross-reference the second navigation buoy identity marker to a second spatial position;
visually acquiring a second direction marker on the second navigation buoy;
in response to visually acquiring the second direction marker, determining a second angle between the camera and the second spatial position; and,
in response to the first spatial position, the second spatial position, the first angle, and the second angle, determining the spatial position of the vehicle.

8. The system of claim 1 wherein determining the first angle includes:
initially identifying a first quadrant with a first quadrant boundary, where the first quadrant represents a first predetermined general geographic direction divided into a plurality of degrees with corresponding degree markers, and where the first quadrant boundary represents a predetermined number of degrees associated with an explicit geographic direction;
counting the number of degree markers between the first quadrant boundary and the first direction marker, creating a count; and,
adding the count to the predetermined number of degrees to calculate the first angle.

9. The method of claim 8 wherein visually acquiring the first direction marker includes selecting a degree marker in a centerline of a vehicle camera image.

10. A system for navigation correction assistance comprising:
a first visual navigation buoy having a predetermined spatial position, an identity marker, and a circumference with predetermined direction markers;
a camera mounted in a vehicle having an output to supply images;
a processor;
a non-transitory memory;
a visual navigation buoy database stored in the memory comprising navigation buoy identify markers cross-referenced to spatial positions; and
a navigation application stored in the memory and enabled as a sequence of processor executable instructions, the navigation application having an interface to receive images from the camera, visually acquire the first visual navigation buoy, access the navigation buoy database to determine a first spatial position associated with the first navigation buoy identity marker, visually acquire a first direction marker on the first navigation buoy, and determine a first angle between the camera and the first spatial position.

11. The system of claim 10 wherein the navigation application has an interface to accept a measurement of a first distance between the vehicle and the first navigation buoy, and in response to the first spatial position, the first angle, and the first distance, determine a spatial position of the vehicle.

12. The system of claim 11 further comprising:
a measurement device having an output interface to supply position-related data for calculating the first distance measurement, where the device is selected from a group consisting of a laser range finder, radar, distance visual calculation module stored in memory as a sequence of processor executable instructions, a global positioning satellite (GPS) receiver, or an inertial measurement unit (IMU).

13. The system of claim 11 further comprising:
a reference measurement device mounted in the vehicle and having an output interface to supply position-related data;
an auxiliary measurement device mounted in the vehicle a predetermined offset from the reference measurement device, having an output interface to supply the position-related data; and,
wherein the navigation application accepts position-related data from the reference and auxiliary measurement devices, applies corrections to account for the offset, and merges the reference and auxiliary measurement device data.

14. The system of claim 11 wherein the first navigation buoy has a visible feature with a predetermined size; and,
wherein the navigation application determines the first distance between the vehicle and the first navigation buoy by calculating a relationship between the predetermined size of the buoy feature and the amount of camera image space occupied by the buoy feature.

15. The system of claim 14 wherein the camera has a zoom lens; and,
wherein the navigation application determines the first distance by calculating the relationship between the predetermined size of the buoy visible feature and the degree of zoom required to occupy a predetermined portion of camera image space.

16. The system of claim 10 further comprising:
a second visual navigation buoy having a predetermined spatial position, an identity marker, and a circumference with predetermined direction markers; and,
wherein the navigation application visually acquires the second navigation buoy, accesses the navigation buoy database to cross-reference the second navigation buoy identity marker to a second spatial position, visually acquires a second direction marker on the second navigation buoy, determines a second angle between the camera and the second spatial position, and in response to the first spatial position, the second spatial position, the first angle, and the second angle, determines the spatial position of the vehicle.

17. The system of claim 10 wherein the first navigation buoy direction markers are organized into quadrants, each quadrant associated with a general geographic direction and divided into a plurality of degrees, where the quadrant boundaries are associated with a predetermined number of degrees cross-referenced to an explicit geographic direction; and,
wherein the navigation application identifies a first quadrant with a first quadrant boundary, counts the number of degree markers between the first quadrant boundary and the first direction marker, creating a count, and adds the count to the predetermined number of degrees associated with the first quadrant boundary to calculate the first angle.

18. The system of claim 17 wherein the navigation application visually acquires the first direction marker by selecting a degree marker in a centerline of the camera image.

19. A navigation buoy system comprising:
a plurality of navigation buoys, each navigation buoy having a predetermined spatial position, an identity marker cross-referenced to its spatial position, and a circumference with a plurality of direction markers.

20. The system of claim 19 wherein the direction markers are organized into quadrants, each quadrant associated with a general geographic direction and divided into a plurality of degrees, and where each quadrant boundary is associated with a predetermined number of degrees cross-referenced to an explicit geographic direction.

* * * * *